(12) United States Patent
Veiga et al.

(10) Patent No.: US 10,675,987 B2
(45) Date of Patent: *Jun. 9, 2020

(54) MECHANISM FOR LOCKING AND FAULT DETECTION IN AN ELECTRICAL VEHICLE SUPPLY EQUIPMENT CORD REEL

(71) Applicants: Peter Veiga, Zion, IL (US); Richard Unetich, Chicago, IL (US); Frank Ray, Crystal Lake, IL (US); John Alford, Kenosha, WI (US)

(72) Inventors: Peter Veiga, Zion, IL (US); Richard Unetich, Chicago, IL (US); Frank Ray, Crystal Lake, IL (US); John Alford, Kenosha, WI (US)

(73) Assignee: Konnectronix, Inc., Waukegan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/519,882

(22) Filed: Jul. 23, 2019

(65) Prior Publication Data

US 2019/0344676 A1 Nov. 14, 2019

Related U.S. Application Data

(63) Continuation of application No. 15/979,239, filed on May 14, 2018, now Pat. No. 10,358,044, which is a
(Continued)

(51) Int. Cl.
*H02J 7/14* (2006.01)
*B60L 53/16* (2019.01)
(Continued)

(52) U.S. Cl.
CPC .............. *B60L 53/16* (2019.02); *B60L 53/14* (2019.02); *B60L 53/18* (2019.02); *B60L 53/60* (2019.02); *H02J 7/14* (2013.01); *B60K 1/00* (2013.01); *B62D 49/06* (2013.01); *B65H 75/44* (2013.01); *H02G 11/02* (2013.01); *H02J 7/00* (2013.01); *H04M 1/15* (2013.01); *Y02T 10/70* (2013.01);
(Continued)

(58) Field of Classification Search
CPC ... H02J 7/00; H02J 7/14; H02G 11/02; B65H 75/44; H04M 1/15; B60K 1/00; B62D 49/06; Y02T 10/70; B60L 11/1816
USPC ............... 320/109, 104, 105; 180/313, 65.1; 191/12.2 R, 12.4, 12.2 A
See application file for complete search history.

(56) References Cited

U.S. PATENT DOCUMENTS 3,569,624 A * 3/1971 Twyford ............ G06Q 20/4037
178/17.5
9,073,441 B2 * 7/2015 Ichikawa ............ B60L 11/1816
(Continued)

FOREIGN PATENT DOCUMENTS

JP 2006079323 A * 3/2006

*Primary Examiner* — Phallaka Kik
(74) *Attorney, Agent, or Firm* — Vitale, Vickrey, Niro & Gasey

(57) ABSTRACT

An electric vehicle charging assembly includes a cord reel, a cord reel locking mechanism, and a master control unit for selectively unlocking the cord reel in response to an authorization signal. The electric vehicle charging assembly monitors the rotational position of the cord reel to prevent unauthorized use, and to record or relay information related to the improper use or malfunction of the electric vehicle charging assembly.

7 Claims, 5 Drawing Sheets

Related U.S. Application Data continuation of application No. 14/968,145, filed on Dec. 14, 2015, now Pat. No. 9,969,278, and a continuation of application No. 13/968,247, filed on Aug. 15, 2013, now Pat. No. 9,211,799.

(51) Int. Cl.

| | | |
|---|---|---|
| *B60L 53/14* | (2019.01) | |
| *B60L 53/60* | (2019.01) | |
| *B60L 53/18* | (2019.01) | |
| *H04M 1/15* | (2006.01) | |
| *H02G 11/02* | (2006.01) | |
| *B60K 1/00* | (2006.01) | |
| *B65H 75/44* | (2006.01) | |
| *B62D 49/06* | (2006.01) | |
| *H02J 7/00* | (2006.01) | |

(52) U.S. Cl.
CPC ........ *Y02T 10/7005* (2013.01); *Y02T 10/7088* (2013.01); *Y02T 90/121* (2013.01); *Y02T 90/14* (2013.01)

(56) References Cited

U.S. PATENT DOCUMENTS

| | | | | |
|---|---|---|---|---|
| 9,150,113 | B2* | 10/2015 | Ichikawa | B60L 11/1824 |
| 9,211,799 | B2* | 12/2015 | Veiga | B60L 53/18 |
| 9,969,278 | B2* | 5/2018 | Veiga | B60L 53/18 |
| 10,090,567 | B2* | 10/2018 | Austin | H01M 10/44 |
| 10,358,044 | B2* | 7/2019 | Veiga | H02J 7/14 |
| 2002/0057584 | A1* | 5/2002 | Brockmann | H02J 7/025 |
| | | | | 363/98 |
| 2009/0057085 | A1* | 3/2009 | Caamano | B65H 75/40 |
| | | | | 191/12.4 |
| 2009/0150579 | A1* | 6/2009 | Hsu | G06F 1/1632 |
| | | | | 710/64 |
| 2012/0256589 | A1* | 10/2012 | Ichikawa | B60L 11/1824 |
| | | | | 320/111 |
| 2012/0262115 | A1* | 10/2012 | Ichikawa | B60L 11/1816 |
| | | | | 320/109 |
| 2016/0221454 | A1* | 8/2016 | Dougan | H01M 10/06 |
| 2018/0351214 | A1* | 12/2018 | Austin | H01M 10/44 |
| 2019/0148785 | A1* | 5/2019 | Austin | H01M 10/44 |

* cited by examiner

MECHANISM FOR LOCKING AND FAULT DETECTION IN AN ELECTRICAL VEHICLE SUPPLY EQUIPMENT CORD REEL

The present application is a continuation of application Ser. No. 15/979,239 filed May 14, 2018, now U.S. Pat. No. 10,358,044 which is a continuation of application Ser. No. 14/968,145 filed on Dec. 14, 2015, now U.S. Pat. No. 9,969,278 which is a continuation of Ser. No. 13/968,247 filed on Aug. 15, 2013, now U.S. Pat. No. 9,211,799.

FIELD OF THE INVENTION

The present invention relates generally to management of security for a retractable cord reel apparatus delivering electrical power to a vehicle, and more specifically to ensuring the safety of the system and the user while preventing the tampering or vandalism of such an apparatus and/or providing notice to the service provider of any such tampering or short event. Cords used for charging batteries in, for example, electric cars, may be used with the present invention when not in use to safely store the cord and protect it from the elements and damage.

A retractable cord reel may be part of a charging station in, for example, a parking lot at an airport or in a home or office garage. The charging station may be a post or other suitable structure containing the cord reel and associated circuitry.

The cord reel assembly described here relates to improved features for improving the security of the cord from vandalism or similar safety issues, with the ability to prevent unspooling of the cord reel in the absence of a card swipe or other recordable event. The invention further relates to the ability to sense and avoid safety issues arising out of the failure of cord reel to retract in the event of mechanical failure or the like. The invention also relates to the ability to report to a remote service facility for these and similar events for servicing.

BACKGROUND OF THE INVENTION

Retractable cord reels have been used in various applications to retractably store various types of cables. Typically, a reel might have a stationary end and a retractable end, the retractable end capable of extension from and retraction back into the reel, and which can be connected to, for example, a battery in an electric vehicle. Using a reel provides convenient storage for the cord. The reel also protects the cord from damage, since it need not be left on the ground. Damage to the cord is reduced. The hazard presented to a user by a damaged electrical cord is also avoided.

The use of a reel has a disadvantage, because such mechanisms involve additional moving parts which, by definition, incrementally increase the potential for malfunction over time or through misuse. In addition, while it may be possible to lock the handle with a locking mechanism so as to provide a secure connection between the interface charger connector and the electric vehicle, or between interface charger connector and a storage point or holder, such a locking mechanism would not, by itself, preclude the ability of a vandal to unspool the cord reel and cut the cord in order to obtain the copper contained therein. To date, however, there are no available products for preventing the unauthorized unspooling of a cord reel in an electric vehicle charging station, nor is there any mechanism for detecting failures associated with the cord reel mechanism in such a cord reel system.

DEFINITION OF TERMS

The following terms are used in the claims of the patent as filed and are intended to have their broadest plain and ordinary meaning consistent with the requirements of the law:

A "retractable cord reel" refers to a cable storage unit and cable management systems having a spooling cord such as the type found in U.S. Pat. No. 5,094,396 to Burke, the subject matter of which is hereby incorporated by reference, and U.S. Patent Application No. 2007/0262185 to Burke, the subject matter of which is also hereby incorporated by reference.

An electric vehicle means any vehicle, including one propelled solely by a rechargeable battery, and one using hybrid propulsion including a rechargeable battery.

An "encoder" means any device use to locate the position of a cord reel, including but not limited to optical, resistive, or digital sensors.

An "authorization signal" means any signal which facilitates the locking or unlocking of a cord reel, including but not limited to a signal for discontinuing a default lock mechanism, a signal for actively changing the lock status, or Where alternative meanings are possible, the broadest meaning is intended. All words used in the claims set forth below are intended for use in the normal, customary usage of grammar and the English language.

SUMMARY OF THE INVENTION

The present invention relates to one or more of the following features, elements or combinations thereof.

One disclosed embodiment is directed to improvements in a retractable cord reel for battery charging stations, including those used for vehicles propelled at least in part by rechargeable batteries. The charging station includes an electric cord connected to a source of power. When used in a public location, storing the cord on a reel helps protect against theft of the cord for its copper such that the charging station can require use of a credit card swipe, key card or similar means to allow use of the station. The present invention particularly provides a mechanism for locking the reeling or unreeling of a cord without a card swipe or similar signal which authorizes the unreeling of the cord and provides a record of the party responsible for the cord in such an event.

Another embodiment of the present invention further includes safety features for enabling the notification of a remote service entity if there are any failures or impediments in the cord reel retraction system causing a loss of retraction. Examples of events leading to a retraction failure sensed by the system could be a broken mainspring, a damaged or fouled cord or a foreign body in the retraction mechanism. The invention also includes an additional proximity sensor and locking mechanism used to secure the charger interface connector (such as a SAE J1772 connector) into its stowage receptacle.

Thus, it can be seen that one object of the disclosed invention is to provide a mechanism for identifying a responsible party in the event of act of vandalism to the charging station system, and in particular to the charging cord of the charging station system.

A further object of the present invention is to preclude the unspooling of the cord in the absence of a card swipe or similar authorizing activity.

Another object of the invention is to detect damage to the cord, or removal of the cord.

Still another object of the present invention is to provide for the reporting of vandalism or malfunction events to a remote servicing location.

It should be noted that not every embodiment of the claimed invention will accomplish each of the objects of the invention set forth above. For instance, certain claimed embodiments of the invention will not require the detection of malfunction events. In addition, further objects of the invention will become apparent based upon the summary of the invention, the detailed description of preferred embodiments, and as illustrated in the accompanying drawings. Such objects, features, and advantages of the present invention will become more apparent in light of the following detailed description of an example embodiment thereof, and as illustrated in the accompanying drawings.

DETAILED DESCRIPTION OF EMBODIMENTS OF THE INVENTION

Figure 1:
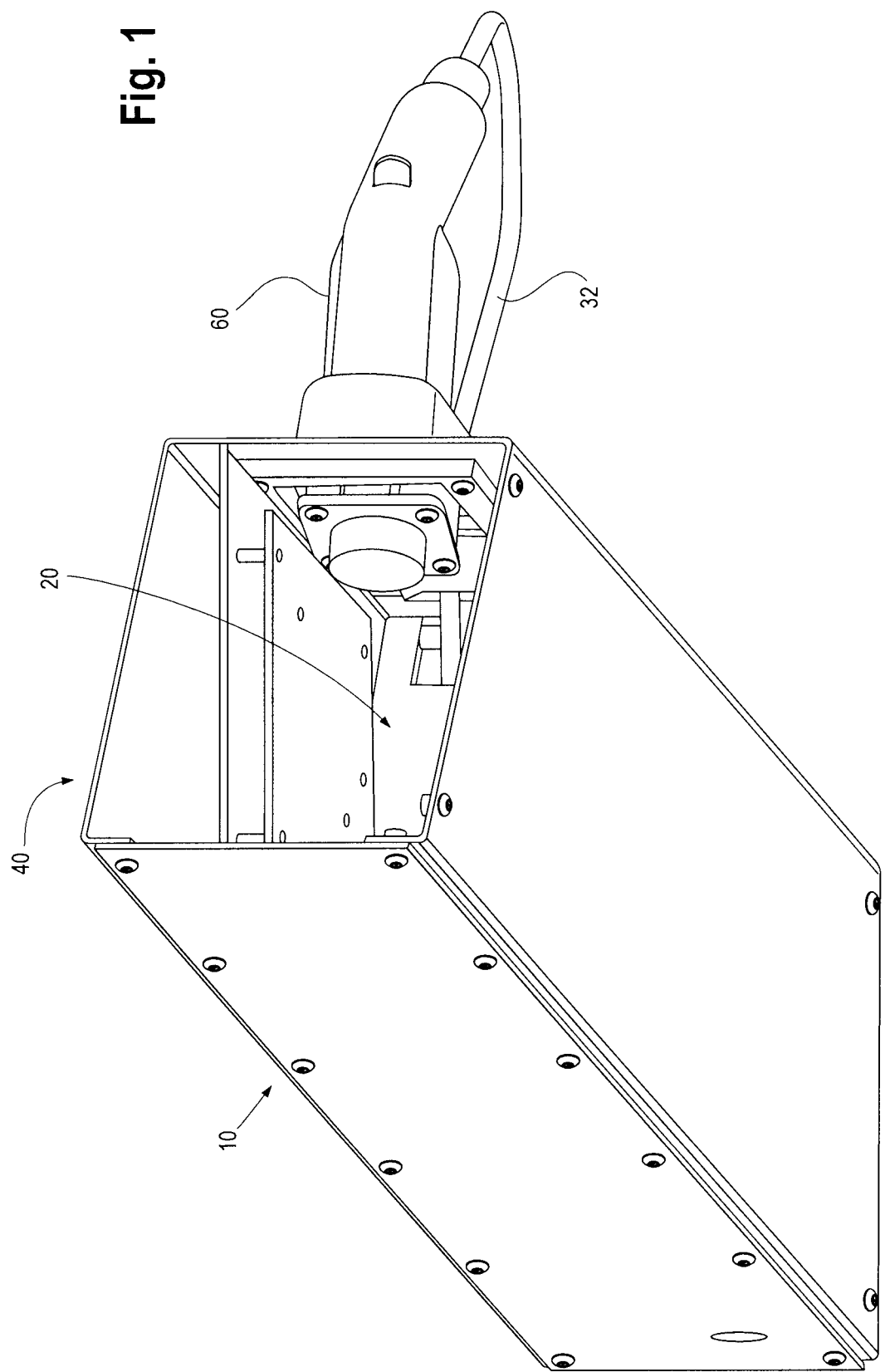
FIG. 1 is a partially exposed perspective figure of a cord reel subassembly and charger interface connector in an electric vehicle charging station in accord with another preferred embodiment of the present invention.

As can be seen in FIG. 1, a charging system 10 includes a cord real subassembly 20, a housing 40, and a vehicle connector 60. The housing 40 preferably contains or is otherwise attached to a master control unit (MCU) 50 as detailed in FIGS. 4 and 5, and described in greater detail below. In this embodiment, because the battery is used for propulsion in a vehicle, vehicle connector 60 is constructed in accordance with SAE Surface Vehicle Recommended Practice J1772, "SAE Electric Vehicle Conductive Charge Coupler," issued by the Society of Automotive Engineers for electric vehicles. For different applications not involving an electric vehicle, connector 16 need not comply with J1772, and its design can be modified as required by the intended use.

Figure 2B:
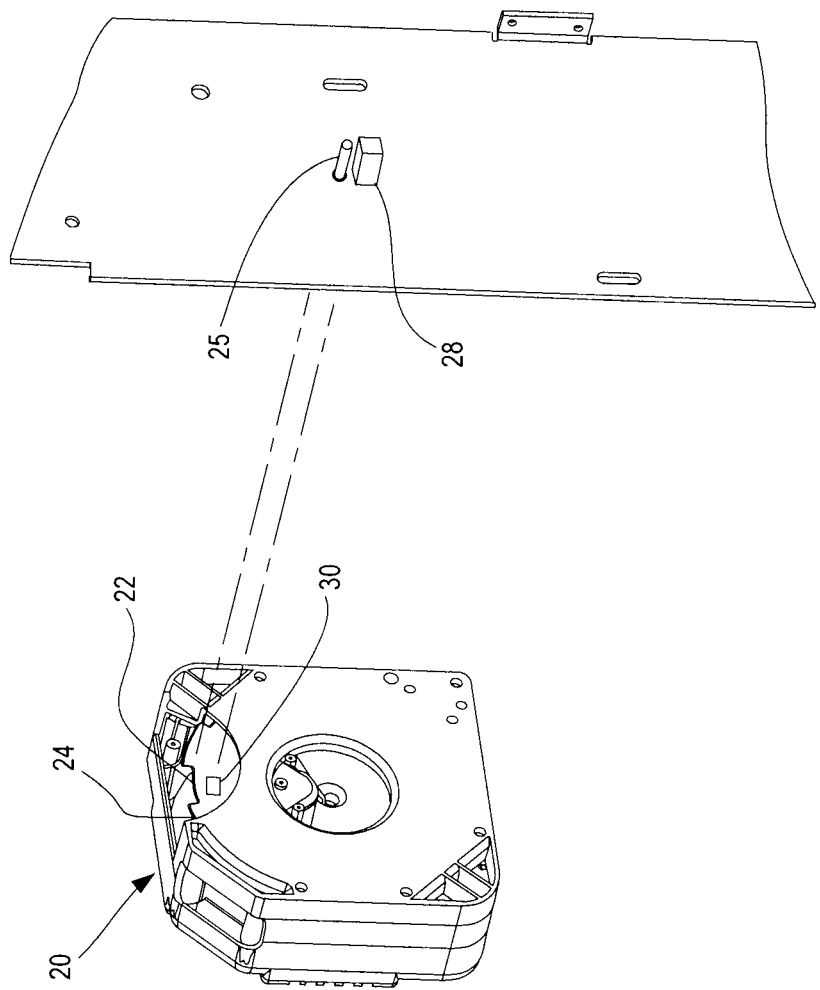
FIGS. 2a and 2b are perspective figures of a cord reel subassembly mounted to a support for an electric vehicle charging station in accord with one preferred embodiment of the present invention.
Figure 2A:
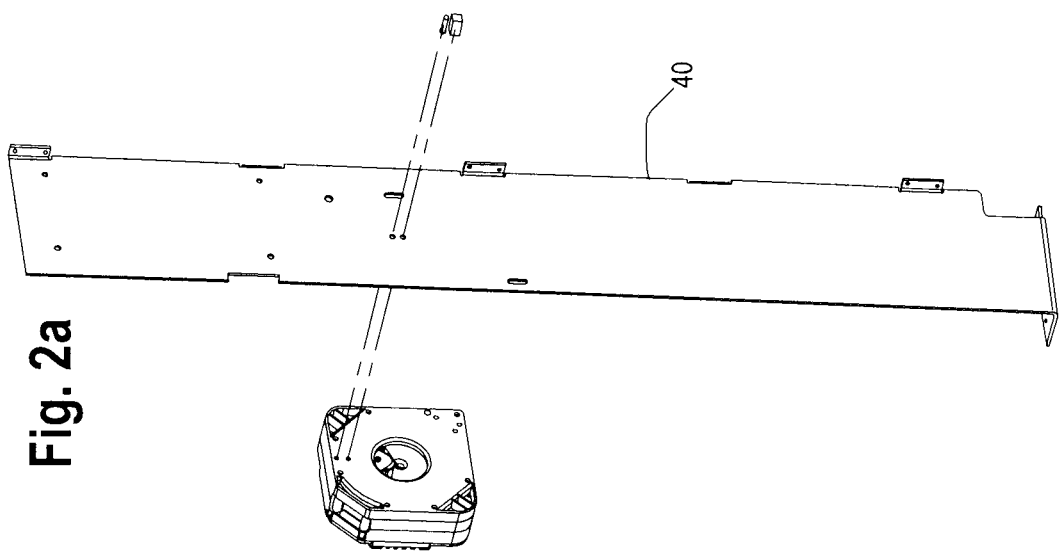
Figure 4:
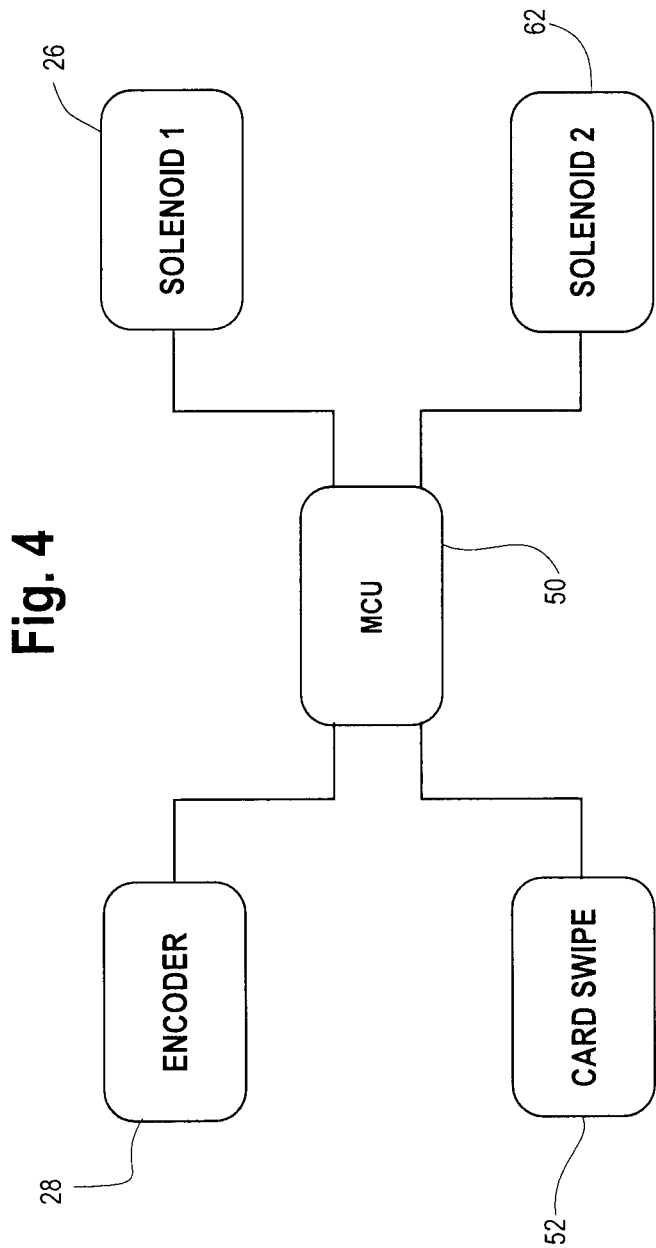
FIG. 4 is a schematic showing the connection in operation between the master control unit and the enocoder, the card swipe mechanism, and the first and second solenoids of a preferred embodiment of the present invention.

As shown in FIG. 2, the cord reel subassembly 20 preferably includes a series of apertures 22 to enable the spool 24 of the cord reel to be locked into a specific rotational location to the housing 40 or a similar fixed support. The physical locking of the cord reel will be enabled by a solenoid 26 which slidably engages one of the apertures 22 and an encoder 28 which is adjacent to the spool 24. The encoder 28 will read marks 30 on the spool 24 indicating the rotational status of the spool 24, i.e., the degree to which the cord 32 is wound or unwound. The encoder 28 communicated readings of the marks 30 to a MCU 50, as shown in FIG. 4. The MCU 50 provides an authorization signal to the solenoid 26, causing the solenoid 26 to slide through aperture 22 into locked or unlocked positions as desired.

As further shown in FIG. 4, the unlocking of solenoid 26—which, in turn, permits or causes the cord 32 to be wound or unwound—may be initiated by the MCU 50 in response to receiving an authorization signal input from a card swipe device 52, which may be alternative mechanisms including a key fob, phone swipe mechanism and/or similar user authorization interface. The MCU 50 can further compare the input from the encoder 28 with the presence or absence of the authorization signal so as to determine if an unauthorized unwinding of the cord 32 (e.g., vandalism or theft) is taking place. The MCU 50 can, in the instance of such an event, record the time of the event and/or the identity information of the last user so as to determine (potentially) the identity of the vandal or thief. Alternatively, the MCU 50 can communicate the unauthorized use event via a remote communication module 52, such a wifi connection or the like, to a remote service facility so as to enable the repair or replacement of the assembly 10 right away. As a further alternative, the MCU 50 can provide a deactivation signal in the event of an unauthorized use so as to prevent the flow of current through the cord 32.

Those of skill will understand that this system 10 will further account for the presence of malfunctions in the cord reel subassembly 20, such as a malfunction of the spring (not shown) which could be detected by the encoder 28 through the failure of the cord 32 to retract.

Figure 5:
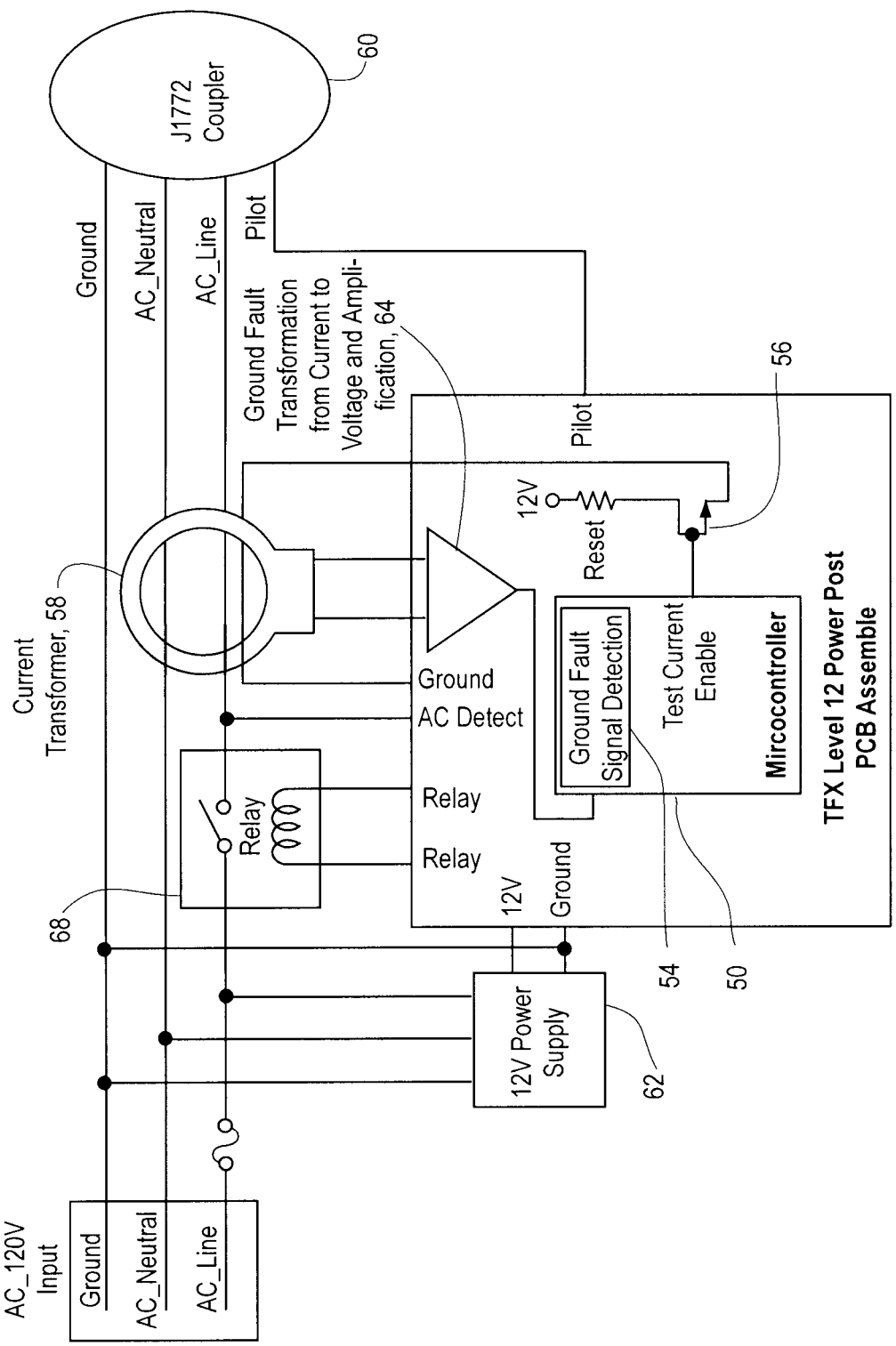
FIG. 5 is a ground fault detection circuit and self-test mechanism according to a preferred embodiment of the present invention.

As shown in FIG. 5, an alternative embodiment of the present invention further provides a ground fault detection circuit 54, which may be located on the same printed circuit board, or is otherwise operatively connected to or integrated with MCU 50. The ground fault detection circuit 54 provides protection to the user and to the device from dangerous conditions that can arise in the field either externally through an unintended path through which current can flow and at different subassembly levels, such as a failed current transformer 58 or wiring connecting that part to circuitry that resides on a circuit board, or the circuitry itself. A self testing scheme of this entire system provides a guarantee of safety of the above subassemblies. Following a successful test, a higher level of safety and lower overall risk is provided.

In this embodiment, the self test may be accomplished through a command from the Microcontroller unit 50 which sends a pulse signal to a transistor 56 that is connected to a specific resistance value, RSET, and a given power supply 62, e.g., 12V. This voltage and resistance generate a corresponding current that is passed through current transformer 58, as well as amplifier 64, which is the same circuitry used to detect and signal the existence of genuine Ground Fault conditions.

As yet another further alternative feature, the MCU 50 can further provide signals which enable the system 10 to recover from ground fault conditions more readily. Specifically, where a genuine ground fault condition has occurred, e.g., where a ground fault happens while charging the vehicle. In such an instance, the MCU 50 will send a signal opening relay 68 to discontinue charging such that the vehicle coupler or connector 60 will not deliver a charge, so as to preserve the safety of the charging locale. However, simply leaving the circuit open in the event of a transient ground fault condition may create an unintended deleterious effect of stopping the charging event where a user is not in attendance to observe such conditions (e.g., an overnight charge). Thus, in such a situation, it is desirable for the MCU 50 to automatically reinitiate the charging event at a short, predetermined interval by sending a second signal to close the relay 68. Thus, in this alternative embodiment, the MCU 50 automatically avoids any long term disabling of the system 10 because of transient ground fault events.

As a variant of handling transient ground fault conditions, a further alternative embodiment could be provided for the MCU 50 to disable and reengage the system 10 in the event of a transient ground fault condition in the act of connecting the vehicle connector 60 to the vehicle, i.e., at the beginning of the charging process. If a ground fault condition were sensed (via the current transformer 58 described above), the MCU 50 could generate a signal opening the relay 68, while basing the timing for reinitiating the charging process upon disengaging the vehicle connector 60 from the vehicle. That is, rather than having a preset time for reinitiating after detecting the ground fault event or opening the relay, the MCU could sense the vehicle connector 60 being disengaged and time the restart of the ability to charge to some preselected time thereafter.

Figure 3:
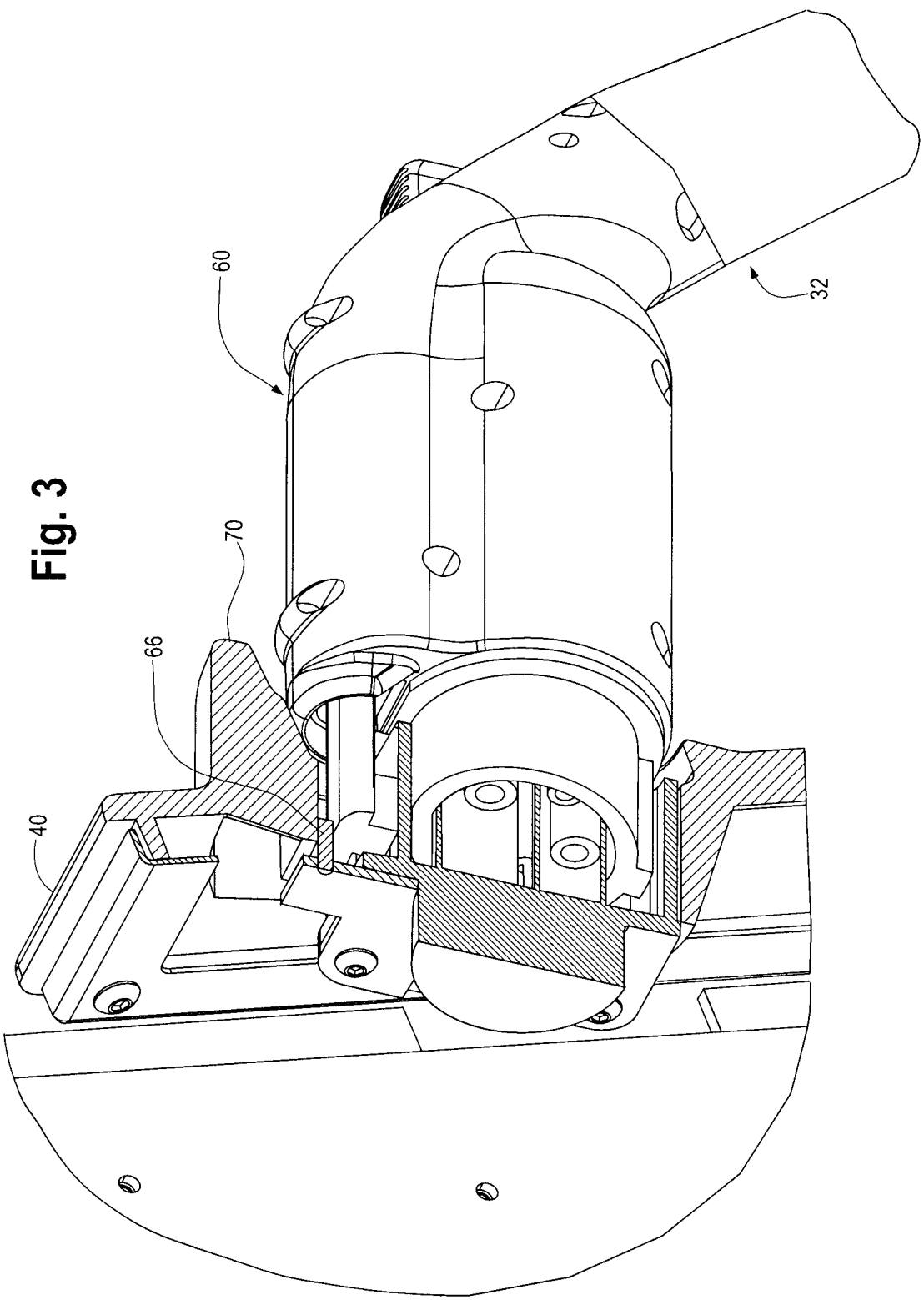
FIG. 3 is an exploded view of a vehicle connector with a locking mechanism in accord with a preferred embodiment of the present invention.

As a further alternative embodiment referenced in FIGS. 3 and 5, the system 10 can include a second solenoid 66 for locking the vehicle connector 60 to a holder 70 in the absence of an authorization signal, the authorization signal being provided from the MCU 50 in the manner as described above.

When used for charging an electric vehicle, the preferred embodiment of the system described herein is a Level 1 charger, as that functionality is described by the California Air Resources Board and codified in title 13 of the California Code of Regulations, the U.S. 1999 National Electrical Code section 625 and in SAE International standards. Such systems use lower voltage and are therefore less expensive and suitable for use at a home or other locations where 120 volt AC power is readily available. Due to the relatively low voltage, charging times are longer, possibly as much as ten to twelve hours for a full recharge of an electric vehicle battery. However, those of skill will understand that the present invention as defined by the claims covers not only Level 1 chargers, but also chargers designated as (for instance) Level 2 under those same standards.

Card swipe device and remote communication module 52 are connected to MCU 50 which can be programmed by one of skill in the art. One suitable microcontroller for the MCU is an Atmel ATMEGA328P from Atmel Corporation of San Jose, Calif.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the spirit and scope of the disclosure as defined by the appended claims.

What is claimed is:

1. A remote vehicle charging system comprising:
   a) a cord reel assembly for selectively providing an electrical cord to facilitate the extension of a vehicle connector;
   b) an authorizing device for supplying an authorization signal so as to unlock the vehicle connector; and
   c) a means for locking connected to the vehicle connector and electrically connected to the authorizing device to prevent the movement of the vehicle connector in the absence of an authorization signal; and
   d) a control circuit operatively connected to the authorization device and the means for locking for automatically preventing charging through the remote vehicle charging system in the event of a fault event or in the absence of an authorization signal.

2. The remote vehicle charging system of claim 1, wherein the control circuit is housed within the remote vehicle charging system for electrically connecting the means for locking with the authorizing device.

3. The remote vehicle charging system of claim 2, wherein the control circuit is a master control unit.

4. The remote vehicle charging system of claim 1 wherein the authorizing device is housed within the remote vehicle charging system.

5. A remote vehicle charging system comprising:
   a) an electric cord terminating in a vehicle connector;
   b) a control circuit operatively connected to the electric cord for automatically preventing charging through the remote vehicle charging system in the event of a fault event; and
   c a self-test circuit connected to the control circuit for restarting charging through the remote vehicle charging system upon the automatic detection of a valid electrical connection.

6. The remote vehicle charging system of claim 5, wherein the self-test circuit tests for the presence of a valid electrical connection at a preselected time interval after the connection of the vehicle connector.

7. The remote vehicle charging system of claim 5, wherein the self-test circuit tests for the presence of a valid electrical connection upon reconnection of a vehicle connector.

* * * * *